United States Patent [19]

Wilmoth

[11] Patent Number: 5,416,627
[45] Date of Patent: May 16, 1995

[54] METHOD AND APPARATUS FOR TWO WAY INFRARED COMMUNICATION

[76] Inventor: Thomas E. Wilmoth, 7891 Wiggins Rd., Howell, Mich. 48843

[21] Appl. No.: 872,975

[22] Filed: Apr. 24, 1992

Related U.S. Application Data

[63] Continuation-in-part of Ser. No. 403,342, Sep. 6, 1989, which is a continuation-in-part of Ser. No. 240,514, Sep. 6, 1988, Pat. No. 5,060,303.

[51] Int. Cl.$^6$ .............................................. H04B 10/22
[52] U.S. Cl. ..................................... 359/159; 359/152
[58] Field of Search ................. 359/172, 159, 163, 152

[56] References Cited

U.S. PATENT DOCUMENTS

| | | | |
|---|---|---|---|
| 4,717,913 | 1/1988 | Avakian | 359/172 |
| 4,727,600 | 2/1988 | Elger | 359/172 |

FOREIGN PATENT DOCUMENTS

| | | | |
|---|---|---|---|
| 2823931 | 12/1979 | Germany | 359/172 |
| 0117833 | 6/1985 | Japan | 359/159 |
| 0053529 | 3/1987 | Japan | 359/159 |

*Primary Examiner*—Leslie Pascal
*Attorney, Agent, or Firm*—Weiner, Carrier & Burt; William F. Esser; Irving M. Weiner

[57] ABSTRACT

A high-speed two-way optical data link has both light-emitting and light-sensing units mounted adjacent one another in a single housing together with a timing and control unit providing all signals necessary for simultaneous transmission and reception of data. Synchronization to a clock signal is achieved by use of edge detectors which reset the counters to zero in the timing and control unit whenever a transition in data pulses is sensed. A pair of computers are linked using a program called "Crosstalk" which performs full parity checking of all data received by an associated computer. The data link permits the computers to be "live handshaking" and asynchronous at all times. Another embodiment comprises a strip array which eliminates the optical bulkiness of a parabolic reflector. The strip array also provides a better collection of infrared light since the photodetectors are spread over a larger area than previously allowed with a parabolic reflector. A further embodiment comprises a hemispherical array for communication throughout a room including an ovate or spheroid configuration.

12 Claims, 11 Drawing Sheets

METHOD AND APPARATUS FOR TWO WAY INFRARED COMMUNICATION

CROSS-REFERENCE TO RELATED APPLICATIONS

This is a continuation-in-part application of U.S. Ser. No. 403,342, filed Sep. 6, 1989, which is a continuation-in-part of U.S. Ser. No. 240,514, filed Sep. 6, 1988, now U.S. Pat. No. 5,060,303.

BACKGROUND OF THE INVENTION

1. Field of the Invention

This invention relates generally to optical data link systems, and more particularly to a high-speed, high data rate optical data link system for transmitting and receiving digital computer data, and the like, through free air as by an infrared light beam or other optical link.

The data link of the present invention may be utilized to provide information to automobiles on roadways to aid in the movement of traffic. Such information could relate to road conditions, accidents, road construction delays, and other related knowledge. An infrared two-way link in accordance with the present invention would be located at selected locations along the roadway. An infrared two-way link would also be provided in automobiles for communicating with the roadway link for receiving the desired information.

The infrared data link of the present invention may be utilized to control power tools used in a manufacturing environment. The power, torque and horizontal and vertical aim of a screwdriver are examples of the application of a data link in accordance with the present invention to a manufacturing facility.

A single enclosed unit in a generally sphere shape may be provided to communicate between computers in a large room, factory, etc. permitting the high speed simultaneous communication of data.

2. Description of the Relevant Art

Heretofore, it has been known to provide integrated circuit chips for low-speed optical data links, such as in hand-held remote control units for video cassette recorders and similar appliances, and in toy ray guns used in tag games. Typically, these known data links are key pad encoders driving a light emitting diode directly, and processing light from the diode at the receiving end by an integrated circuit chip having a 40 Kilohertz carrier frequency and about a 2 or 3 Kilohertz modulated data rate at the most.

There is a need, however, for bidirectional optical data links between computers and for use with automotive test stands, hand-held data terminals, and the like. These links must, in addition to having a simultaneous bidirectional capability, operate at very high frequencies with a resulting data rate far greater than those obtained by known data links.

IBM Technical Disclosure Bulleting, Vol. 20, No. 7, December 1977, in the name of Closs et al., entitled "WIRELESS CONNECTION BETWEEN A CONTROLLER AND A PLURALITY OF TERMINALS", discloses a system wherein infrared signal transmission is used for connecting a controller with a plurality of terminals in a single room. A downlink from controller to terminals is established by irradiating the room ceiling with an array of LED's or lasers located in the controller. The diffusely reflected signal is then detected by the receivers in the terminals. An uplink from the terminals to the controller is similar where each terminal has its own array of light emitting diodes but operates on a different infrared wavelength to avoid channel interference in the case of baseband transmission. The two wavelengths are separated by an optical interference filter. As an alternative, the two channels may be separated by different carrier frequencies.

U.S. Pat. No. 4,398,515, issued in 1983, to de Neumann, entitled "PROCESSOR ARRANGEMENT", discloses a number of individual autonomous processor units wherein data communication between the individual processors takes place by means of radiated electromagnetic waves. All of the processors obtain the energy needed to operate them from a common emissive source. The information which the processor receives is obtained via an optical device and an associated receiver. Photodiodes are used and are arranged to operate in the appropriate part of the spectrum, and if required, would be infrared diodes.

The operation of the processors is synchronized by modulating the light emitted by the light source with a synchronization clock signal.

The device of U.S. Pat. No. 4,398,515, however, allocates a particular time slot for data transmission, and does not allow for simultaneous two-way communication over a link.

U.S. Pat. No. 4,553,267, issued in 1985, to Crimmins, entitled "INFRARED TELEPHONE EXTENSION MODULATION SYSTEM", discloses a portable telephone or other signaling system having a remote unit responsive to operator voice and control signals to modulate infrared emitting diodes. The modulation of the infrared diodes occurs with narrowband FM low duty cycle pulses. A modulated infrared emission is provided for remote signaling used in conjunction with complete network control to provide on-hook and off-hook control and network dialing functions all from a portable unit.

Again, the arrangement of the above patent fails to provide for simultaneous two-way communication over an optical data link.

German Patent 2,823,931 also discloses a telephone signaling system similar to Crimmins.

U.S. Pat. No. 4,688,037 issued in 1987, to Krieg, entitled "ELECTROMAGNETIC COMMUNICATIONS AND SWITCHING SYSTEM", discloses a system for line-of-sight remote selection actuation of a wide variety of apparatuses. A sight couples the eyes of the operator and an array of control positions. The sight is mounted on the head of the operator and defines a line-of-sight for the operator. A processor is provided for converting the portions of the electromagnetic fields received by receiving antennas into the position orientation of receiving antennas with respect to radiating antennas. Using the sight, the operator selectively points to a desired control position and the processor determines which control position is being selected by determining the position and orientation of the operator's head, and thus the line-of-sight of the operator.

Although this reference discloses a type of optical data link, it does not disclose a high speed, bidirectional computer interface for portable communication.

U.S. Pat. Nos. 3,867,628, and 3,967,111 issued in 1975 and 1976, respectively, to Brown discloses techniques for receiving pulsed light.

U.S. Pat. No. 3,996,476 issued in 1976 to Lazzara, and U.S. Pat. No. 3,774,039 issued in 1973 to Price disclose photoelectric apparatus capable of detecting reflected light. These assemblies, however, are not intended for use adjacent to an assembly emitting light in the same direction from which light is being received.

The "Optodata" 5200 system manufactured by Scientific Technologies Incorporated permits transmission of data via line-of-sight over an infrared beam to both stationary and moving targets, but requires two separate pairs of units, two at each end, for two-way communication. In addition, the second pair of units in a side-by-side arrangement must use different frequencies than the first pair of units. That is, each of the "Optodata" units, which use only a single frequency as a carrier, must be frequency matched to a paired unit and frequency mismatched to adjacent units.

SUMMARY OF THE INVENTION

The present invention may suitably comprise, consist of, or consist essentially of, a high-speed, two-way optical data link which includes a divider chain that produces all timing and control signals for both transmitting and receiving functions. Synchronization is achieved by use of an oscillator to supply clock signals to the divider chain, and an edge detector for sensing the transitions of the inputted data pulses and resetting all counters in the divider chain to the transitions so as to synchronize the system to the leading edge of the clock signals.

One embodiment uses discrete high-speed transistor-transistor logic (TTL) to incorporate a 24 Megahertz front-end oscillator which provides the system with data synchronization within 1/24 of a microsecond.

Another embodiment of the invention packages the timing and control logic in a housing together with light-emitting and sensing units to permit simultaneous and independent operation of both transmitter and receiver. The light-sensing unit uses a parabolic reflector and spaced placement of the light-emitting elements along a direction of light transmission to prevent extraneous light from reaching the light sensor. The light-emitting elements can permit an alignment angle of about 45° at approximately 30 feet by suitable dimensioning of the light-emitting unit.

Yet another embodiment of the invention utilizes transceiver units according to the present invention to link a pair of computers using a program called "Crosstalk" which performs full parity checking of all data received. Both computers are live handshaking at all times, and they are asynchronous. The system requires no clock slaving between the computers.

A still further embodiment has a light-emitting assembly and a light-sensing assembly arranged coaxially of one another to obtain a more compact and more readily attainable unit. Note, focus is fixed by sensor and dish placement. Adjustment is facilitated by a swivel mounting base on the unit, with a light path through the light-emitting assembly to the light-sensing assembly being shielded from side reflected light, light echoes, and the like.

A still further embodiment of the present invention includes a planar transceiver array of photodetectors and photo-emitters which would provide higher power and increased sensitivity during a linkage between computers.

A still further embodiment of the present invention envisions providing the planar transceiver array in a hemispherical arrangement to provide a "data dome" which would permit linkage of several computers in a single room.

Therefore, it is a primary object of the present invention to provide a high-speed, two-way data link.

Another object of the present invention is to provide the data link utilizing high-speed TTL and provide the system with data synchronization.

Still another object of the present invention is to provide a unit which permits simultaneous and independent operation of both a transmitter and receiver.

Still another object of the present invention is to provide a planar transceiver array of photoemitters.

Yet another object of the present invention is to provide the planar transceiver array in ovate or spheroid configuration.

The above and further objects, details and advantages of the invention will become apparent from the following detailed description when read in conjunction with accompanying drawings.

DETAILED DESCRIPTION OF SOME PREFERRED EMBODIMENTS

Figures 1, 3:
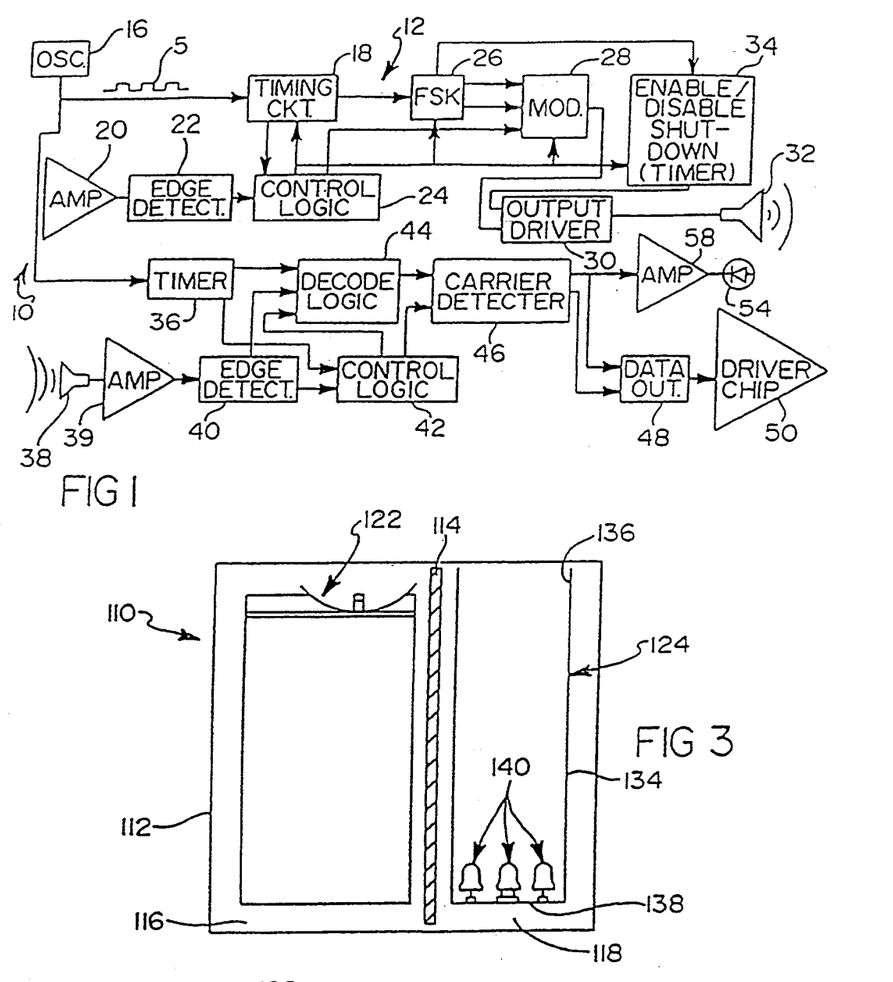
FIG. 1 illustrates a functional block diagram showing a transceiver constructed in accordance with the present invention.
FIG. 3 illustrates a diagrammatic vertical sectional view showing a preferred manner of packaging an array of light-emitting diodes (LED's) and a photosensor for simultaneous transmission and receiving in accordance with the present invention.

Referring now more particularly to FIG. 1 of the drawings, an apparatus for high-speed communication of data according to the present invention comprising a timing and control logic divider chain 10 for simultaneously producing timing and control signals in a transmitter circuit 12 and a receiver circuit 14 is shown. In the transmitter circuit 12, an oscillator 16 applies a synchronization clock carrier frequency signal 5 to a timing circuit 18. Transitions of data pulses received through an amplifier stage 20 are detected by an edge detector 22, and the circuit 12 is synchronized to a leading edge of the carrier frequency, or clock signal as a function of data transitions detected through a control logic circuit 24.

Two frequency shift key timebase carrier frequencies representing respectively a high and low input data signal are produced in a frequency shift (FSK) time base 26 connected to timing circuit 18 and control logic circuit 24. These frequencies are encoded by a modulator 28 and fed to an output driver 30 for transmission by a light-emitting assembly 32. Output driver 30 is controlled by an enable/disable shut-down circuit 34 actuated by control logic circuit 24 and time base 26 so as to disable driver 30 when no data is received in circuit 12.

Receiver circuit 14 includes a timing circuit 36 connected to oscillator 16. A light-sensing assembly 38 receives incoming data signals and passes them through an amplifier stage 39 to an edge detector 40 which detects transitions in the data signals and synchronizes circuit 14 in control logic circuit 42 in a manner similar to edge detector 22. The received data signals are fed from edge detector 40 to a decode logic circuit 44 where they are decoded and passed, via a carrier detector 46, to a data output circuit 48 and out to a RS 232 level converter or driver chip 50.

Carrier detector 46 can direct a signal through an amplifier 52 to a light-emitting diode (LED) 54, and the like, to provide a visual indication assembly 53 for a carrier frequency signal and indicating to an operator (not shown) that the unit is operational even though there may be no data being transmitted to the receiver circuit 14.

Figure 2:
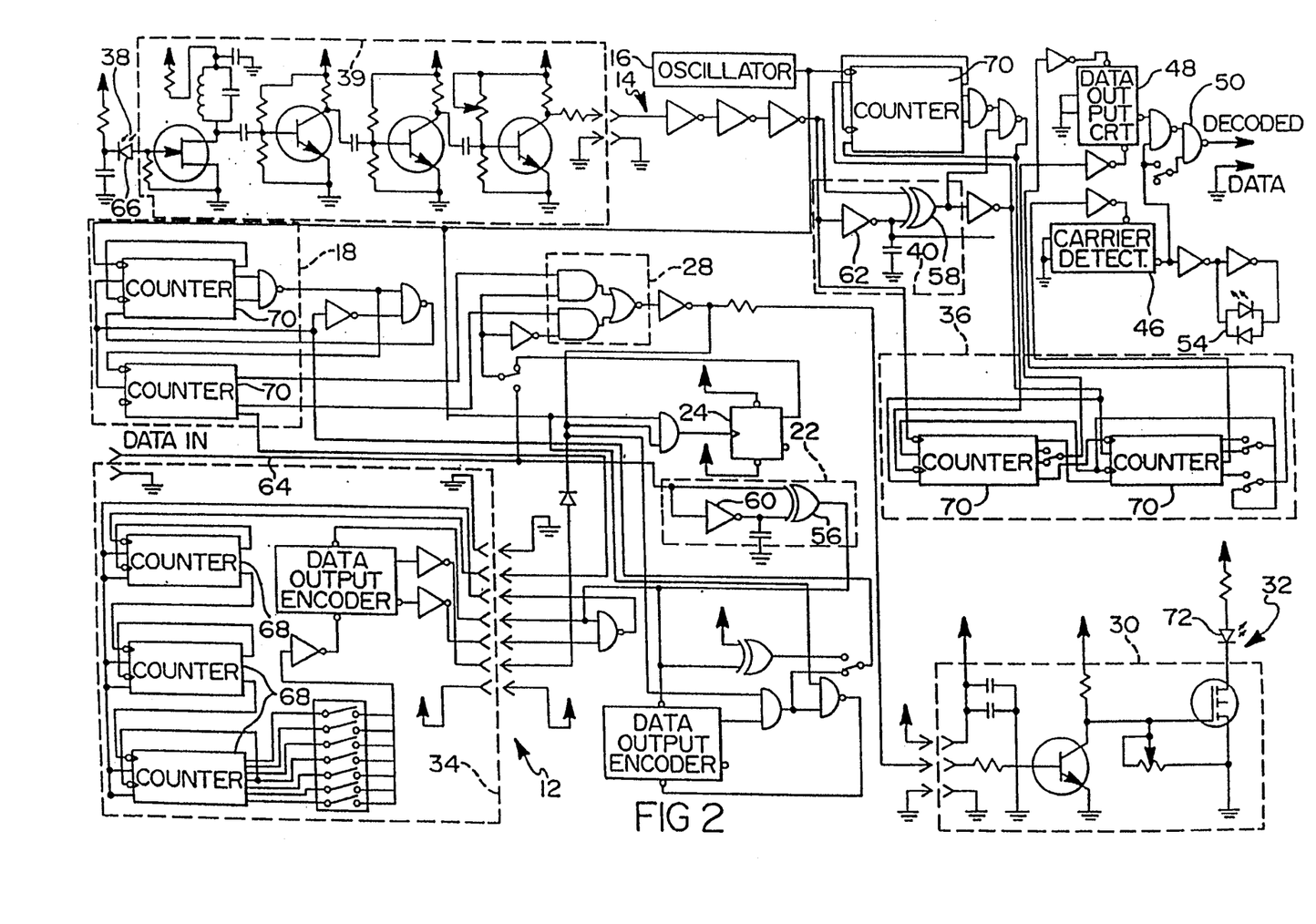
FIG. 2 illustrates a schematic diagram showing details of a preferred embodiment of a transceiver as set forth in FIG. 1.

Although the circuits of divider chain 10 can be constructed by any suitable, known semiconductor techniques, including complementary metal oxide semiconductor techniques (CMOS), a circuit for carrying out the present invention using transistor-transistor logic (TTL) is shown in FIG. 2 of the drawings.

Oscillator 16, which can be a 24 Megahertz front-end oscillator giving data synchronization within 1/24 of a microsecond, is connected to exclusive OR gates 56 and 58 forming the edge detectors 22 and 40, respectively. Inserted into one input of each gate 56 and 58 is a respective invertor 60 and 62 to invert a signal to an associated gate 22, 40 received either from data input amplifier 20 (FIG. 1) over a line 64, or from a photodiode 66 forming light sensing assembly 38.

Whenever the respective edge detectors 22 and 40 detect a transition in an incoming data pulse (that is, whenever a data pulse goes from 0 to 1 or from 1 to 0) the associated gate 56, 58 outputs a signal which resets the counter 68 and 70, respectively, to zero so as to synchronize the transitions to the leading edge of a clock pulse from oscillator 16.

The time base 26 functions to reduce the carrier frequency to two reduced frequencies representing high and low, or 0 and 1, levels of data signals, respectively. When a 24 Megahertz oscillator is employed for oscillator 26, frequencies of 500 kilohertz and 250 kilohertz have been found satisfactory for the output of time base 26. A ratio of 2 to 1 is effective to minimize a phase beat frequency shift seen in reconstructed data, thereby maximizing use of the circuit at high frequencies, currently 1MHZ and 500 KHZ respectively.

Advantageously, output driver 30 will preferably, but not necessarily, be an infrared driver, as illustrated, and will drive an infrared light-emitting diode (LED) 72, and the like.

With single phase +12 to +15 volt operation, transmitter 12 current can range between 70 milliamperes and 100 milliamperes, and receiver and logic maximum current of <100 milliamperes. The total transmitter/receiver delay in such a system was measured as 4 microseconds.

Referring now more particularly to FIG. 3 of the drawings, a two-way optical data link 110 in accordance with the present invention comprises a housing 112 defining a hollow interior divided by a wall 114 into adjacent compartment 116 and 118. Disposed in compartment 116 together with a timing and control logic system 120, which can be similar to system 10, is a light sensing assembly 122, equivalent to assembly 38, arranged for receiving light from a source (not shown) spaced in a given direction from housing 112. Disposed in the compartment 118 is a light-emitting assembly 124 arranged for directing light in the same direction, upwardly as shown, as light sensing assembly 122 receives light. The light sensing assembly 122 is shielded from light emitted by assembly 124 in a manner to become clear below.

Figure 4:
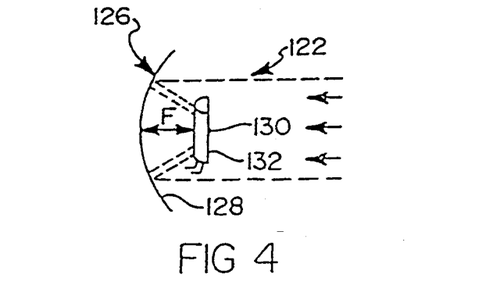
FIG. 4 illustrates a diagrammatic sectional view showing the photosensor assembly of FIG. 3 in greater detail.

Referring to FIG. 4, light sensing assembly 122 includes a parabolic reflector 126 mounted on the housing so as to face outwardly therefrom, forming a concave surface 128 defining a focal point 130 oriented in the direction of light reception. Mounted on reflector 126 at a focal point 130 is, for example, an infrared photodiode 132, equivalent to photodiode 66, for detecting incoming light rays r reflected from surface 128 of the reflector 126 toward focal point 130.

The distance, or focal length, between point 130 and the surface 128 of reflector 126 is determined by the concavity of the reflector 126.

Figure 5:
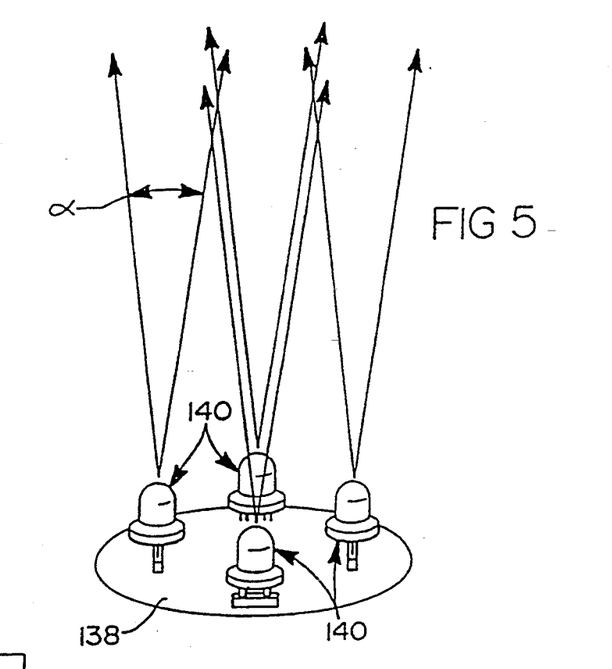
FIG. 5 illustrates a diagrammatic perspective view showing the LED's of FIG. 3 in greater detail.

As shown in FIG. 3, the light-emitting assembly 124 comprises a sleeve or tube 134 open at an end 136 arranged adjacent assembly 122, and closed at the opposed end by a base plate 138 on which are arranged one or more light-emitting diodes 140. Four infrared diodes, each equivalent to diode 72, shown in FIG. 2, are illustrated in FIG. 5 so as to be in spaced relation to assembly 122 in the light-emitting direction. By proper dimensioning of tube 134, and placement of diodes 140 on base plate 138, each diode 140 can provide an alignment angle $\alpha$ of 45° at about 30 feet (9.144 meters) distance from housing 112.

Although not illustrated, housing 112 can be provided with a standard pin base for facilitating mounting of unit 110 on an associated computer (not shown) and the like. A 25-pin base configuration has been found suitable.

Unit 110 is very compact, with dimensions of 2"×3"×4" (5.08 cm×7.62 cm×10.16 cm) being obtainable for housing 112. Data rates as high as 300K bits per second are possible without data synchronization. Unit 110 is highly immune to ambient light and heat interference, and can transmit and receive over, for example, about 10 meters distance. It is proposed that the unit 110 may be used with automotive test and diagnostic systems, hand-held data logging systems, portable PC's and terminals, office local area networks (LAN), or any application where direct wire transfer of large volumes of data are impossible or hazardous.

A high-speed two-way data link according to the present invention has been used asynchronously with a like unit in live handshaking operation, i.e., continuous two-way communication-between two "IBM" XT computers (not shown) running at, for example, 9600 baud. A program called "Crosstalk" was used with each computer to accomplish parity checking on data received by each computer.

A unit 110 is capable of being interfaced with other digital equipment by transistor-transistor logic (TTL), complimentary metal oxide semiconductor (CMOS) techniques, and serial communication standards RS 232 and RS 422.

Figures 6, 7:
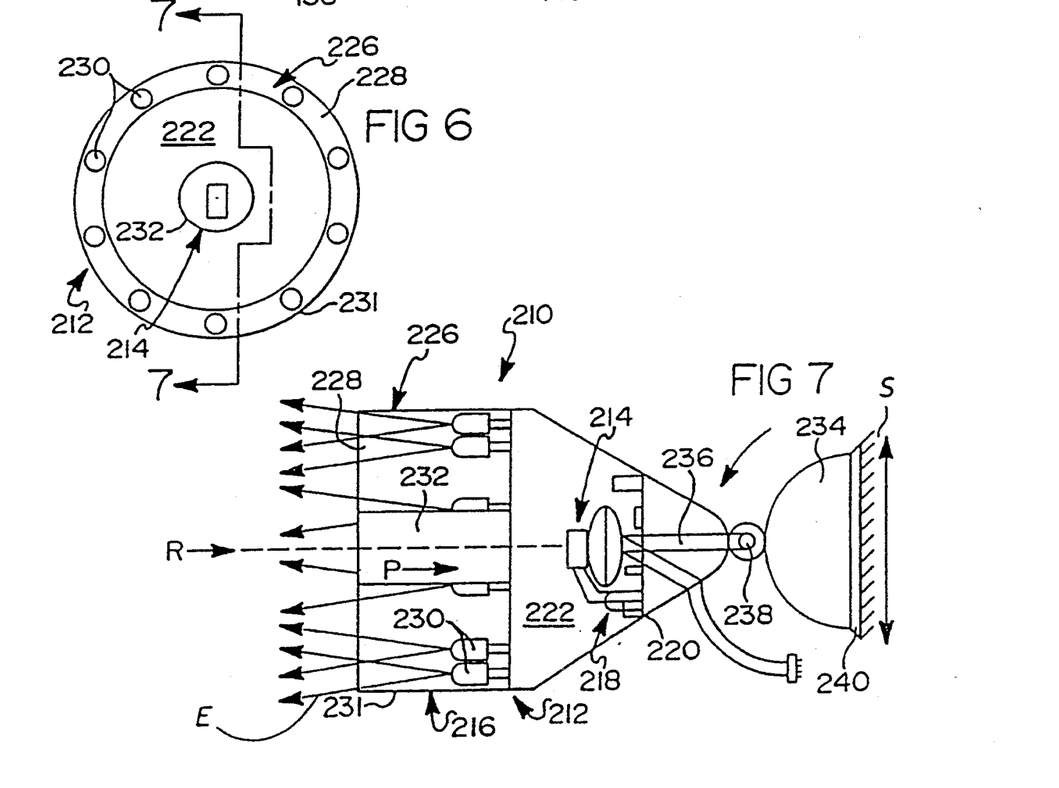
FIG. 6 illustrates a diagrammatic, front elevational view of a further embodiment of a high-speed two-way data link according to the present invention.
FIG. 7 illustrates a diagrammatic dew partially in a cross section taken generally along the line 7—7 of FIG. 6.

FIGS. 6 and 7 of the drawings illustrate a more compact and readily focusable apparatus 210 according to the present invention, comprising a housing 212 having arranged therein a light-sensing assembly 214, which can be constructed from a reflector and photodiode in the manner of light-sensing assembly 122 discussed above, and a light-emitting assembly 216. Also disposed within housing 212 is a timing and control circuit 218 which can be constructed in the identical manner as divider chain 10 discussed above with respect to FIG. 1.

As can be seen from FIGS. 6 and 7, assemblies 214 and 216 are arranged coaxially of one another for transmitting and receiving light in a common direction along a common axis.

The housing 212 includes a conically-shaped casing 220 forming a chamber 222 arranged to diverge to an open rim 224 for permitting light R being received, while circuit 218 is placed in the casing 220 rearwardly of assembly 214.

Housing 212 further includes an annular member 226 defining an axis a—a and mounted on casing 220 at the open rim 224 thereof and extending away from the casing 220 in a direction of emitted light E. Mounted on a base 228 of annular member 226 are a plurality of light sources 230, ten such sources being shown disposed symmetrically about the base 228 of annular member 226. Light sources 230 can be similar to, for example, LED's 140 (FIG. 3).

A front portion 231 of annular member 226 may optionally be provided in the manner of a lens constructed of suitable transparent materials by known techniques, with it being possible to leave the front of member 226 open, if desired. Advantageously, side walls of the front portion 231 can converge away from base 228, with the latter being configured accordingly, in order to focus light sources 230 at an optimum distance.

A hollow cylinder 232, constructed from an opaque material or suitably coated, has a longitudinal axis disposed coaxially with axis a—a and generally coextensive with annular member 226 for defining a shielded light path P through the annular member 226 and into the chamber 22 of casing 220. Cylinder 232 thus forms a narrow channel input to light-sensing assembly 214 which cuts down or eliminates side reflections, echoes, and the like created by light-emitting assembly 216.

Housing 212 is optionally mounted on a suitable support S by a swivel base 234 attached to casing 220 as by a U-shaped bracket 236 and a swivel joint 238 to pivotally mount casing 220 on base 234 and to permit adjustment of casing 220 and annular member 226 relative to a cooperating apparatus 210 for facilitating aiming of light-sensing assembly 214 and light-emitting assembly 216 on the cooperating apparatus 210. Focusing is made easier by the coaxial alignment of the assemblies 214 and 216, which eliminates parallax problems. Base 234 can be provided with a slide 240, and the like, to facilitate mounting of apparatus 210 on a support S.

For example, a seven conductor cable 242 extends from the timing and control circuit 218 for selective connection of same, for example, to digital processor circuiting (not shown) in a known manner.

It would be most advantageous to provide a homogeneous mix of photodetectors and photoemitters without the optical bulkiness of a dish assembly 128.

Figures 8, 9, 10:
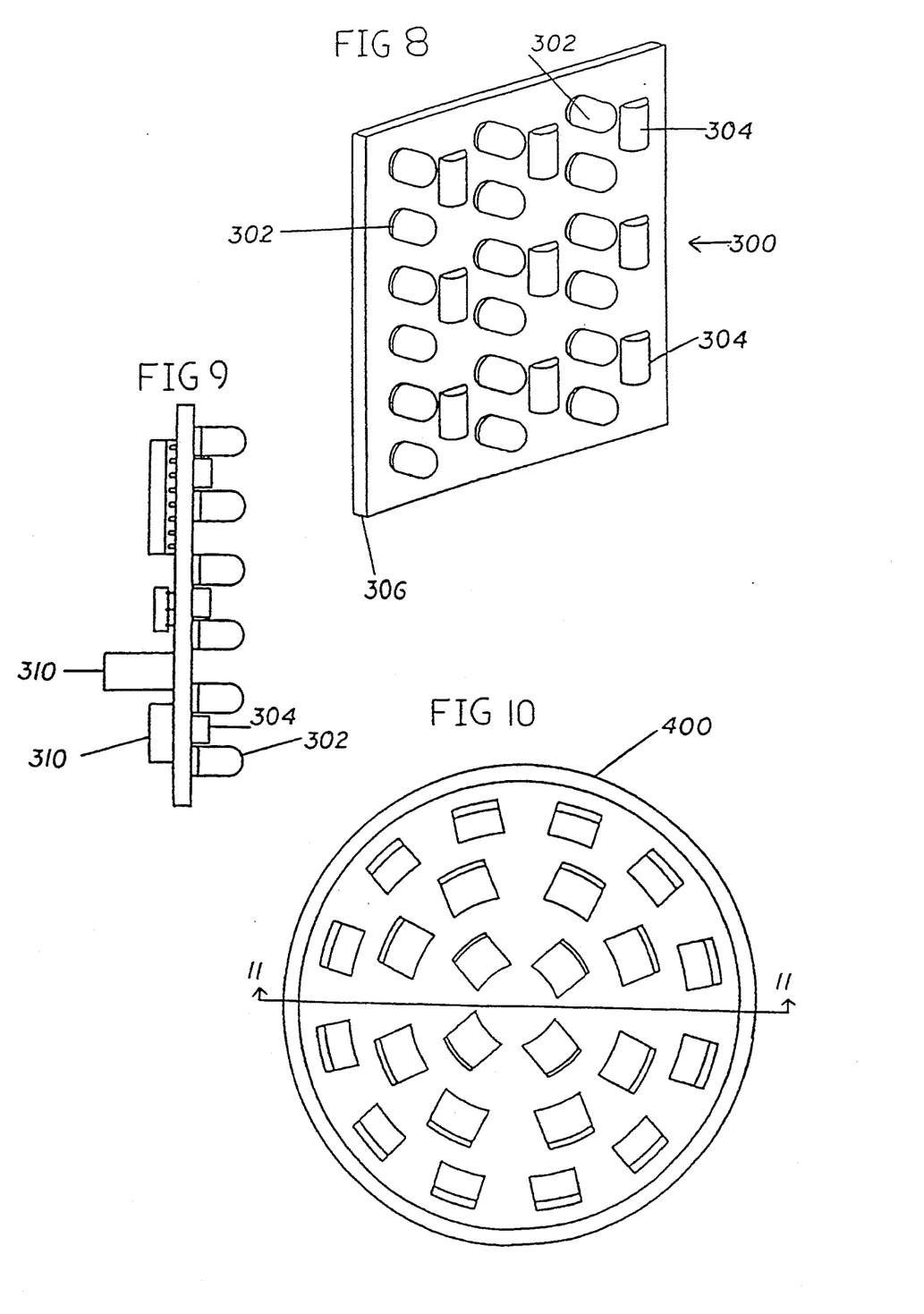
FIG. 8 illustrates a perspective view of a planar transceiver array in accordance with the present invention.
FIG. 9 illustrates a side view of the planar array shown in FIG. 8.
FIG. 10 illustrates a top view of a hemispherical dome in accordance with the present invention.

Shown in FIGS. 8 and 9 is a planar transceiver assembly 300. The assembly 300 includes an array of infrared emitting diodes (LED) 302 and infrared sensitive photodiodes 304. Preferably, but not necessarily, the array comprises four rows of six LED's 302. The array is mounted upon a ground plane printed circuit board 306. The board 306 includes driver and receiver electronics 310 mounted opposite the emitters 302 and diodes 304. Diodes 304 are shielded from the transmitted signals from LED 302 since they are mounted to be below the transmitted light.

The above described array permits the marriage of a transmitter and receiver without the bulkiness of a dish assembly 128 as previously discussed with respect to FIGS. 3 and 4.

The diodes 304 are distributed over a larger area than provided by a dish assembly and thus the array is more sensitive then previous embodiments.

A typical array would include four rows of 6 LED's 302, which can be selectively turned on and off, with corresponding diodes 304. The electronics 310 would include one driver chip, four channels wide. Such a chip is well known and will control the intensity of transmission by turning on or off the various banks of LED's 302 to increase or decrease the signal. The array 300 will be approximately 1.5" (3.81 cm) to 2" (5.08 cm) square and possibly permit the signal to be received at 100 feet.

Standard FSK modulation techniques do not provide the advantages of operating in a power-pulsed mode modulation. The power-pulsed mode differs from FSK modulation in that continuous sending is not used. The power-pulsed modulation reduces current consumption and heat buildup in the LED's. The need for power dropping resistors in the output circuit is also eliminated since the LED's are off or inoperative most of the time and thus can tolerate large pulses of power for a very short time period during transmission. A higher power output signal (with respect to effective photon emissions) is achieved due to the higher effective junction current which can be applied. Thus, a short 2 clock tick "Blip" of infrared light at the moment of a data state change from 1 to 0, or 0 to 1 is transmitted then the transmitter is inactive.

Figures 17, 17B:
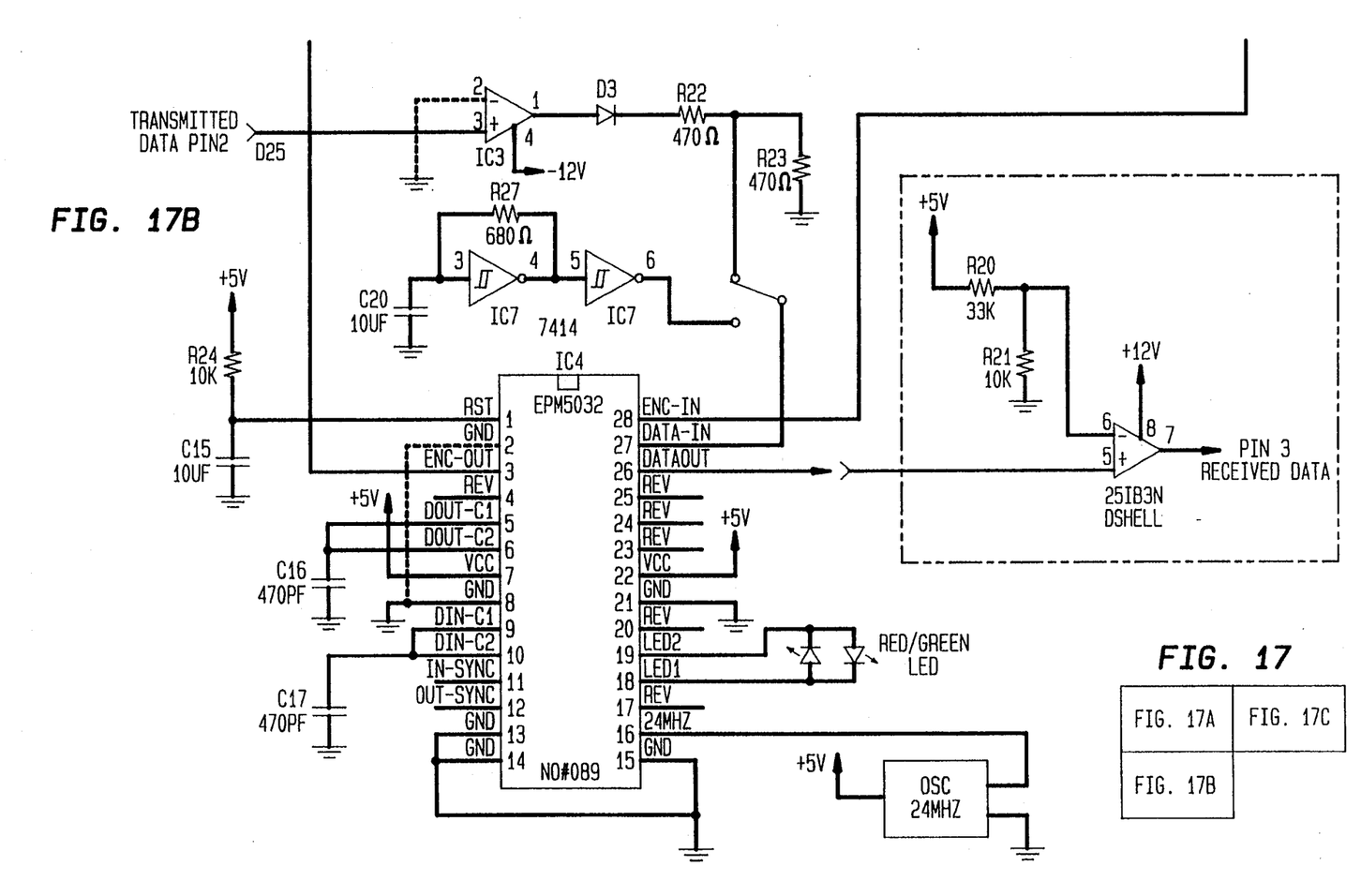
FIG. 17 illustrates a schematic diagram showing details of the embodiment of FIG. 15.
Figure 17A:
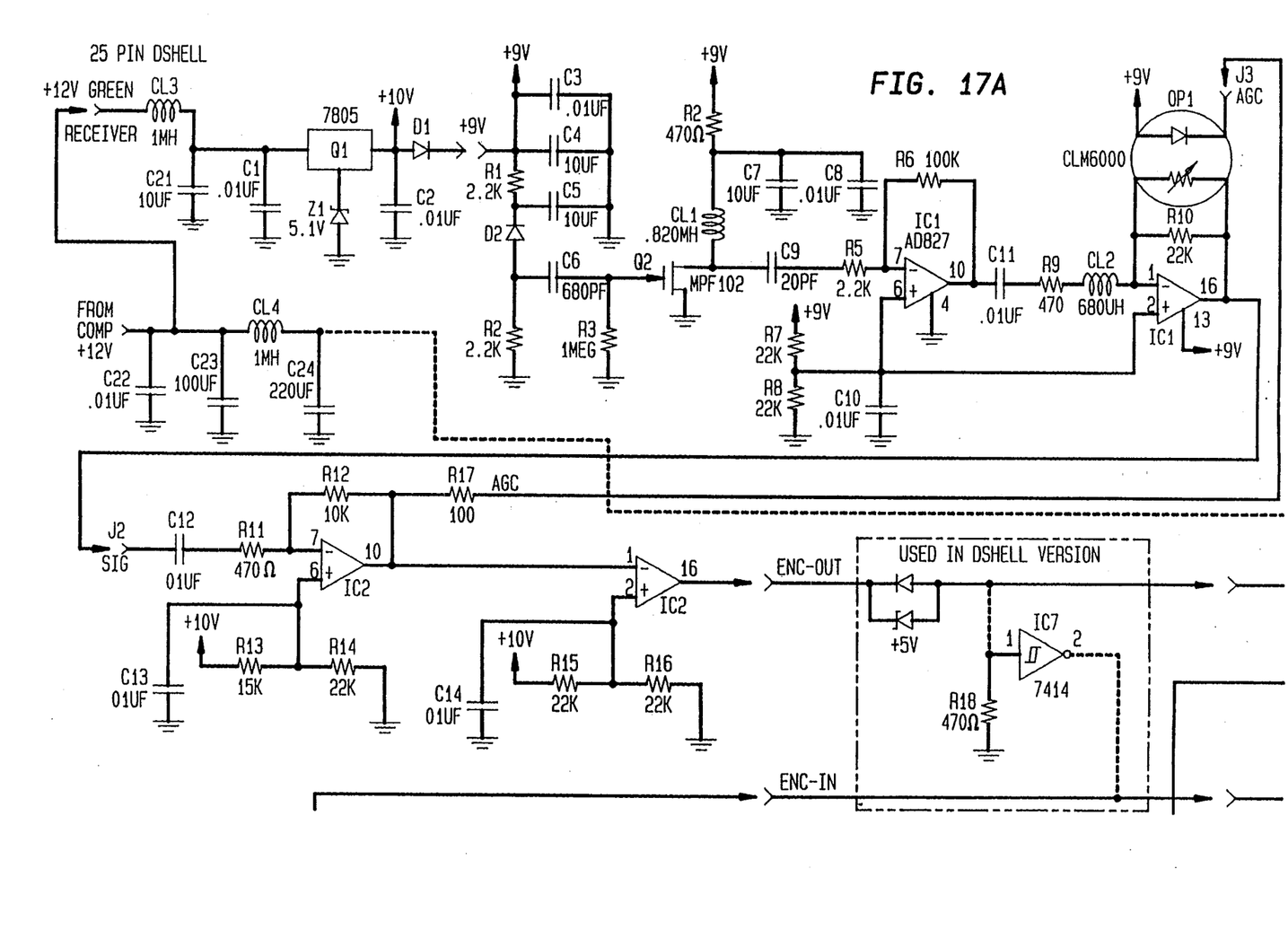
Figure 17C:
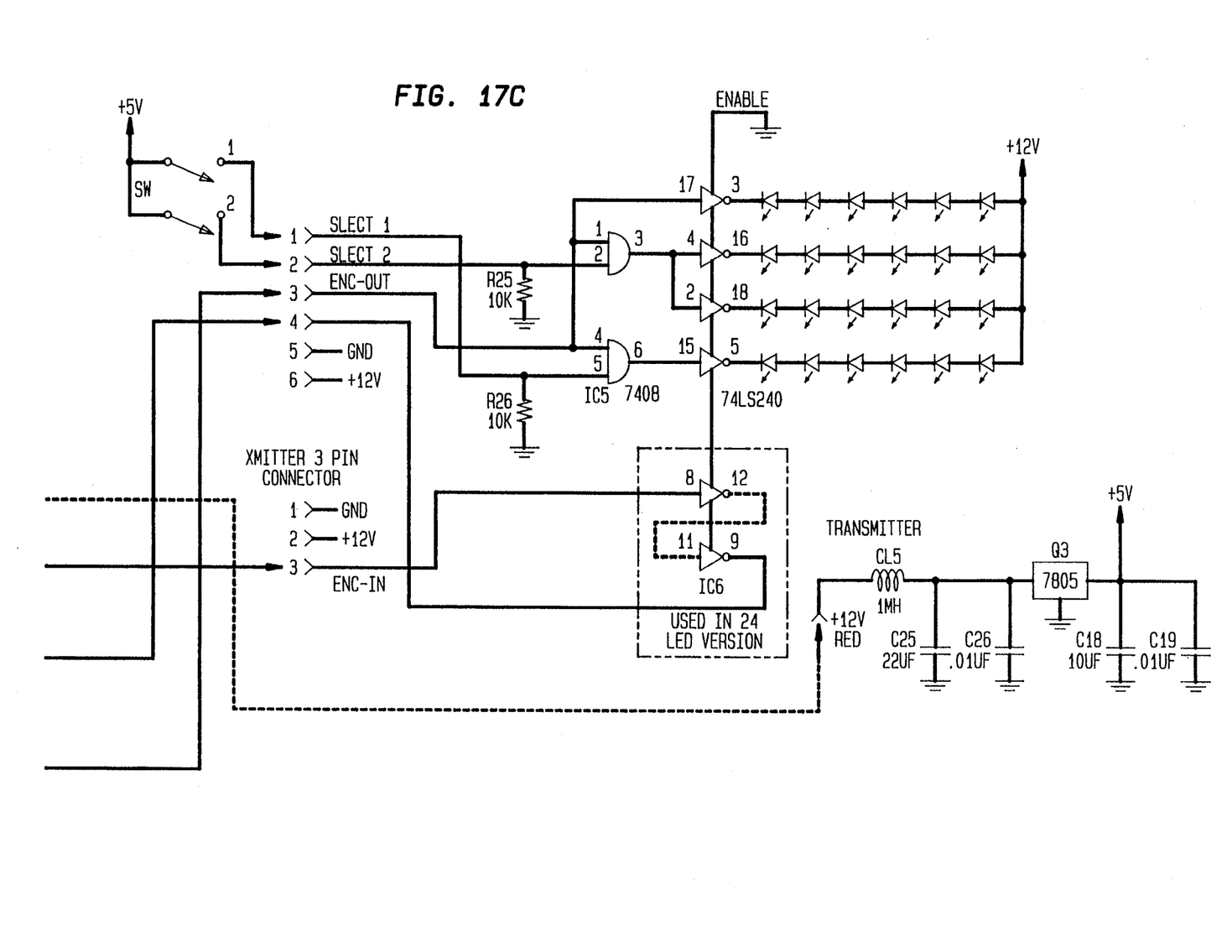
Figure 18:
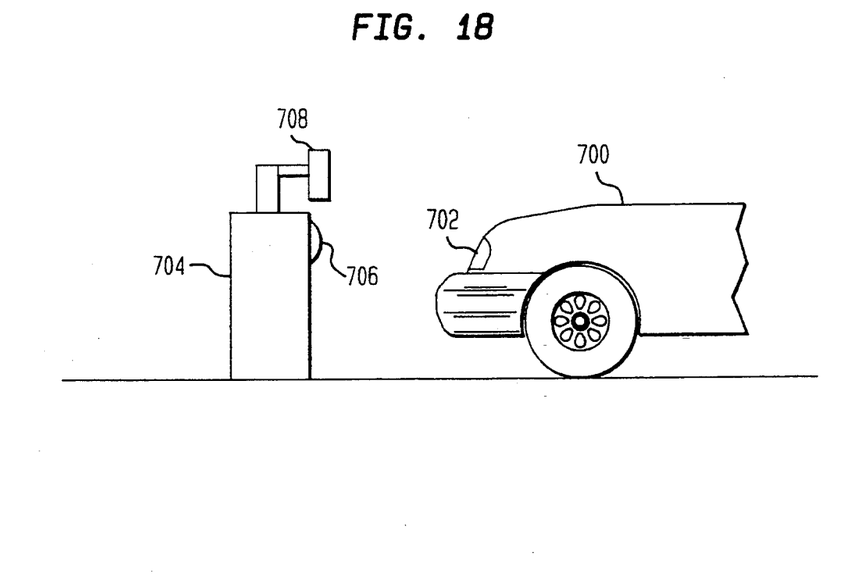
FIGS. 18 and 19 illustrate further embodiments.
Figure 19:
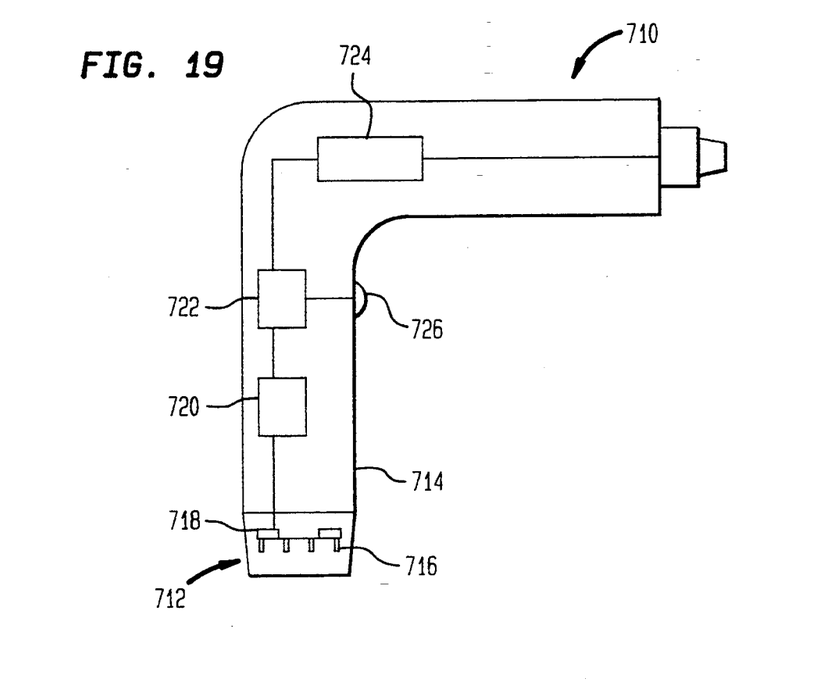

Another type of modulation capable of high efficiency when used in conjunction with the present invention includes transistor—transistor logic (TTL) bus drivers (note FIG. 17) such as a 74LS240 chip. These chips would be provided as a "totem pole" output permitting the LED's to be placed in an "active-ready" state instead of being completely turned off. For example, when the driver output goes to turn off, instead of "going open", it raises to +5 V TTL VCC.

The "active-ready" status possible with TTL modulation allows more efficient use of the energy in the system, allows the driver chip to be pulsed more rapidly, and allows a higher data transmission rate.

An echo cancellation time slot is provided in view of the increased speed and doubled bandwidth achieved with the TTL modulation. Such echo cancellation time slots essentially eliminate the additional speed achieved using TTL modulation but provide noise immunity between the transmitter and the receiver. Such an arrangement eliminates electromagnetic shielding requirements and the complexity associated therewith. The receiver is "off" during transmission to keep it from "seeing" any optically reflected echoes.

In view of this "blinding" of the receiver, it is necessary to shut down the transmitter when the receiver is receiving a transmission. This prevents a loss of transmitted data. However, because of the higher bandwidth and speed of sending, the time lost during which a pair of units can not "talk" is extremely small. In addition, it is possible to include a "receiver done" signal to indicate to the transmitter it is possible to send the next piece of data. The receiver and transmitter have been effectively interlocked to prevent errors. This interlock or "handshaking" is not apparent to the user.

To the computers utilizing such transceivers, simultaneous reception and transmission is present since the computers are synchronously meshed.

A further advantage achieved with TTL modulation is the ability to increase the number of LED's transmitting data. Effectively, there is no upper limit on the number of LED's and thus the transmission distance. An upper limit on the number of LED's and the corresponding transmission distance have not been determined at this time.

Figure 11:
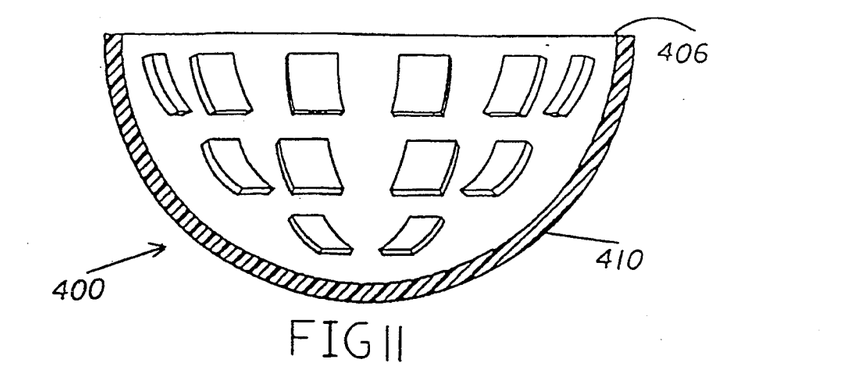
FIG. 11 illustrates a cross-sectional view taken along line 11—11 in FIG. 10.
Figure 12:
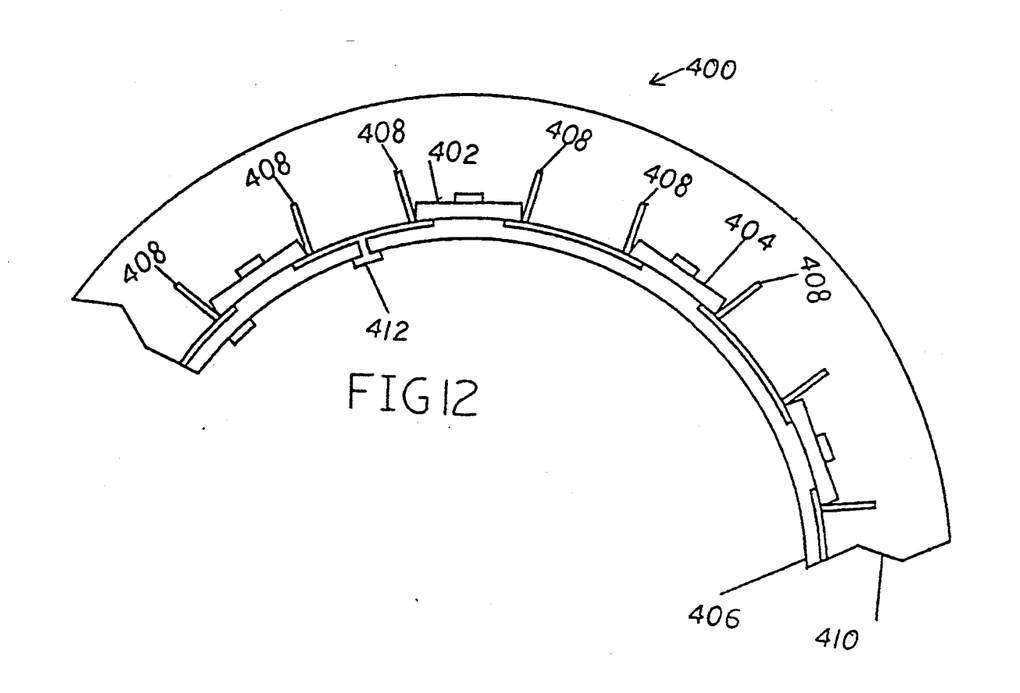
FIG. 12 illustrates a detailed view of the specific arrangement of the hemispherical dome of FIG. 10.

Shown in FIGS. 10 and 11 is a hemispherical array 400 of the planar assembly 300 resembling a dome. This arrangement is of similar construction as the planar assembly 300. FIG. 12 illustrates the specific arrangement of the hemispherical array of infrared LED's 402 and diodes 404 mounted on a hemispherical plastic molded printed circuit board 406. As discussed above with respect to the assembly 300, a greater number of LED's than diodes would be provided. Board 406 will include etched patterns on the inner side to mount the control electronics and any additional printed circuit boards (not shown) that are required for the operation of the device.

The LED's 402 and diodes 404 may be surrounded by optical baffles 408 to direct the infrared output and to shield the diodes 404 from reflections and interference which may result from the LED's 402 emitting infrared signals adjacent the diodes 404.

It is proposed that a molded coating 410 be added to the array after testing of the equipment. This coating is preferably an optical epoxy coating as is well known in the art.

Member 412 indicates the control electronics which may be mounted inside the hemispherical array. Additional printed circuit boards may also be provided adjacent member 412.

Figure 13:
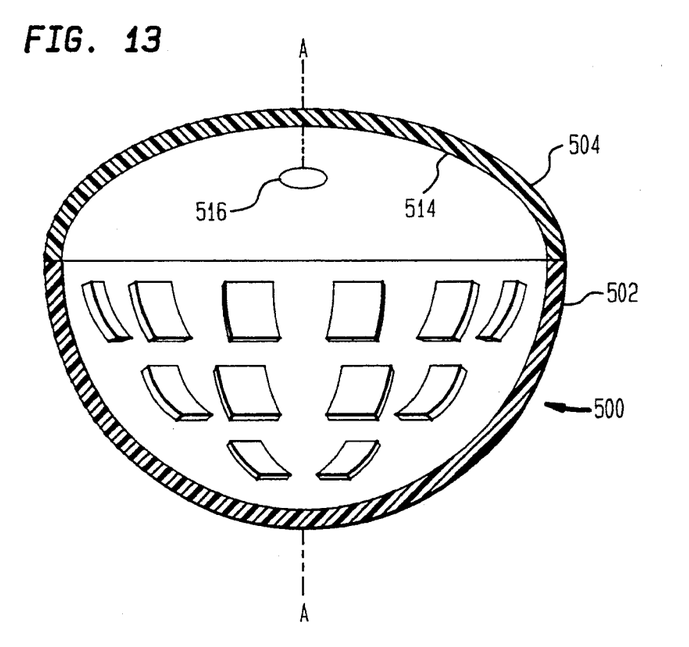
FIG. 13 illustrates a cross-sectional view of a further embodiment of the present invention including a reflector and photosensor.
Figure 14:
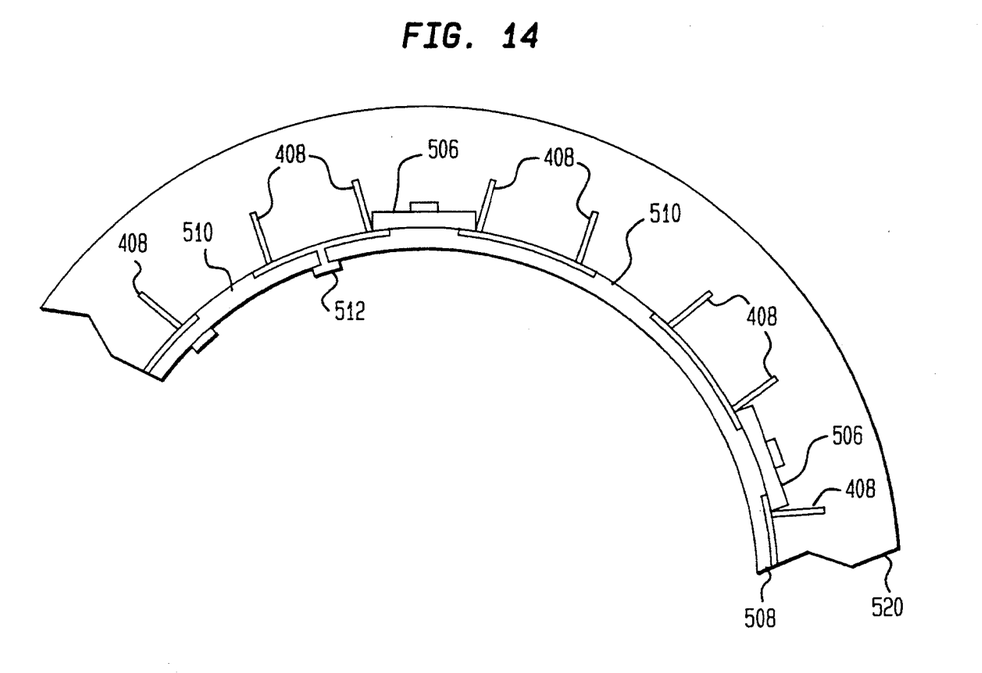
FIG. 14 illustrates a partial detailed perspective view of the embodiment shown in FIG. 13.

FIG. 13 illustrates an embodiment of the present invention utilizing a curved or hemispherical light emitting assembly 502 and a reflector-type light sensing assembly 504 coaxially mounted in a single ovate or spheroid data link enclosure 500. By using the term "coaxially mounted" to describe the relationship between the assembly 502 and assembly 504, the "in-line" or substantially in-line relationship of these assemblies is defined. The center of each assembly are provided substantially on the same axis A—A shown in FIG. 13. The enclosure 500, with suitable support structure, would be mounted in a similar manner as the embodiment shown in FIGS. 10-12. Data link enclosure 500 may be used to relay data between computers or act as a central data collection/transmitting station for a computer or other data device.

As best seen in FIG. 13, data link enclosure 500, the light emitting assembly 502 comprises an array of infrared transmitter means comprising LED's 506 mounted on a hemispherical molded printed circuit board 508. Board 508 includes shielding devices 408 mounted thereon to prevent interference between incoming and sending signals. Board 508 will also include a plurality of windows 510 which permit infrared transmissions into the enclosure 500 to contact reflective surface, and etched patterns on the inner side to mount the control electronics 512 and any additional printed circuit boards (not shown) that are required for the proper and efficient operation of the device 500.

Light sensing assembly 504 is similar to the parabolic reflector discussed above with respect to FIGS. 3 and 4. A reflective concave surface 514 is provided on the inner side of assembly 504 to direct all incoming signals to a focal point. Mounted at the focal point is, for example, an infrared photodiode 516 for detecting incoming light rays from windows 510 reflected off surface 514. The light sensing assembly 504 and light emitting diode 502 are operatively connected to the control means as discussed above with respect to the embodiment of the present invention.

Unit 500 may be compact, with various dimensions being obtainable for the housing depending on specific requirements, such as transmission power requirements and reflector size for incoming signals. Data rates as high as 300K bits per second are possible without data synchronization. Unit 500 is highly immune to ambient light and heat interference, and can transmit and receive over, for example, about 10 meters distance. It is proposed that the unit 500 may be used with automotive manufacturing, testing and diagnostic systems, handheld data logging systems, portable PC's and terminals, office local area networks (LAN), or any application where direct wire transfer of large volumes of data is impossible or hazardous.

A high-speed two-way data link according to the present invention has been used asynchronously with a like unit in live handshaking operation, i.e., continuous two-way communication-between two "IBM" XT computers (not shown) running at, for example, 9600 baud. A program called "Crosstalk" was used with each computer to accomplish parity checking on data received by each computer. Unit 500 is capable of being interfaced with other digital equipment by transistor-transistor logic (TTL), complimentary standard ports RS 232 and RS 422, as discussed above.

The light sensing assembly 504 may vary in size and shape to vary the enclosure 500 to a sphere or egg-shaped object. In addition, the assembly 504 may be small enough to fit within light emitting assembly 502 resulting in a dome-like structure similar to that shown in FIGS. 10-12 (not shown).

With a support arm (not shown), the enclosure 500 may be mounted in various locations as convenient to the particular circumstances. With the addition of at least one hook, the enclosure 500 could be hung from a ceiling or other support (not shown).

It is proposed that an optical epoxy 520 may be added to the enclosure 500 after testing of the equipment. Higher speed and more efficient excitation of the LED's 502 can be achieved by utilizing transistor-transistor-logic (TTL) bus drivers (seen in FIG. 17).

Figure 15:
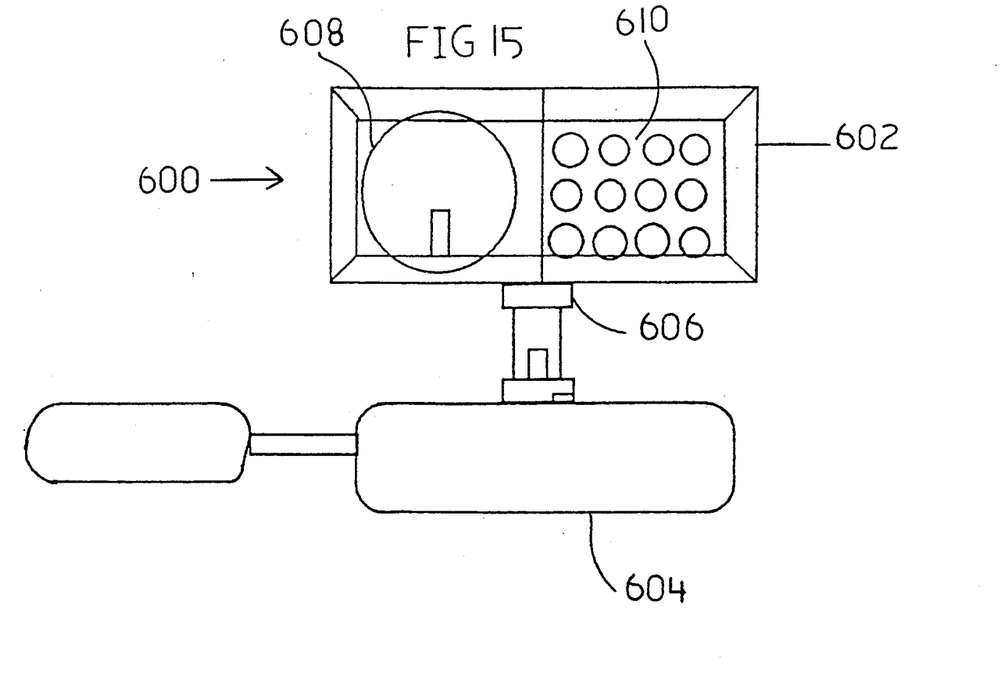
FIG. 15 illustrates a front view of a further embodiment of the transceiver in accordance with the present invention.
Figure 16:
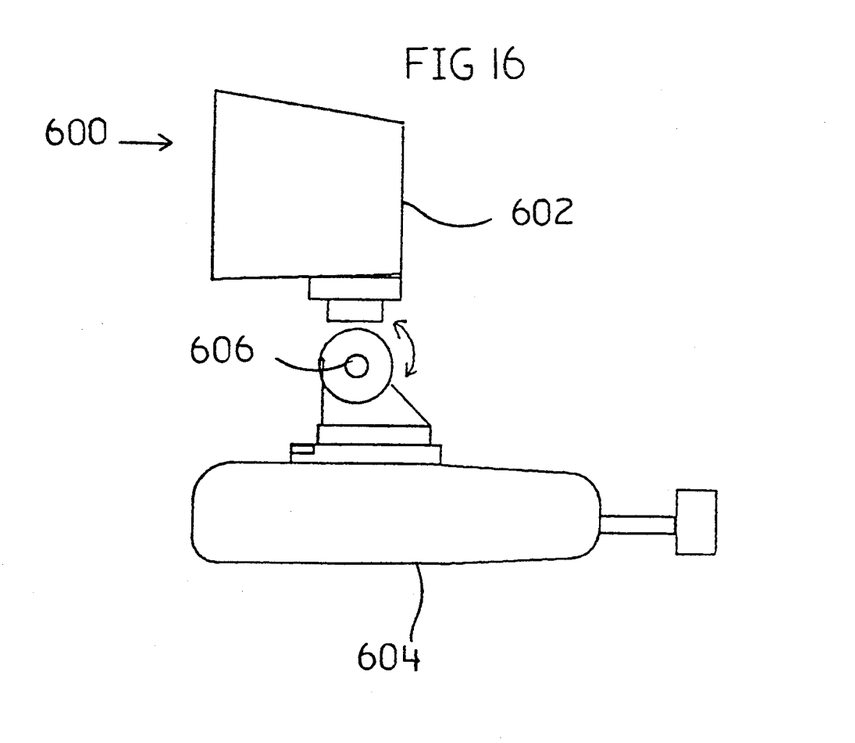
FIG. 16 illustrates a first side view of the embodiment shown in FIG. 15 in accordance with the present invention.

As seen in FIGS. 15 and 16, a further embodiment of a transceiver 600 in accordance with the present invention includes an upper portion 602 and a lower portion 604 which are pivotably interconnected at 606. The upper portion includes a receiver 608 and a transmitter 610 as discussed above, the receiver may include a dish (as discussed above). The angle of the upper portion 602 may be adjusted relative to lower portion 604 in order to provide clear reception and transmission paths. The transceiver 600 may thus be adjusted for unit-to-unit transmission/reception for communication with a suspended transceiver such as unit 500 shown in FIG. 13.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. An apparatus for transmitting and receiving signals over a two-way, high-speed, optical data link which allows for transmission and reception operations to occur independently and simultaneously, said apparatus comprising:
   a hemispherical light-emitting assembly;
   transmitting means disposed upon the outer portion of said hemispherical light-emitting assembly;
   a light-sensing assembly disposed proximally to said transmitting means on said hemispherical light-emitting assembly and having a substantially concave surface;
   control means mounted within said hemispherical light-emitting assembly for simultaneous transmission and reception of data; and
   said hemispherical light-emitting assembly including a printed circuit board.

2. The apparatus of claim 1, wherein:
   said light-sensing assembly is shielded from said transmitting means by a plurality of optical baffles.

3. The apparatus of claim 1, wherein:
   said printed circuit board includes a plurality of windows.

4. An apparatus for transmitting and receiving signals over a two-way, high-speed, optical data link which allows for transmission and reception operations to occur independently and simultaneously, said apparatus comprising:
   a hemispherical light-emitting assembly;
   transmitting means disposed upon the outer portion of said hemispherical light-emitting assembly;
   a light-sensing assembly disposed proximally to said transmitting means on said hemispherical light-emitting assembly and having a substantially concave surface;
   control means mounted within said hemispherical light-emitting assembly for simultaneous transmission and reception of data;
   said hemispherical light-emitting assembly including a printed circuit board;
   said transmitting means including a plurality of light-emitting diodes mounted on the outer surface of said hemispherical light-emitting assembly; and
   said light-sensing assembly including an infrared sensitive diode disposed at the focal point of a reflective concave surface mounted on the inner side of said hemispherical assembly.

5. The apparatus of claim 4, wherein:
   said light-sensing assembly is shielded from said transmitting means.

6. The apparatus of claim 5, wherein:
   said hemispherical light-emitting assembly includes an outer coating applied to said assembly after said apparatus has been tested electrically.

7. The apparatus of claim 6, wherein:
   said outer coating is a molded epoxy coating.

8. An apparatus for simultaneously transmitting and receiving signals over an optical data link, said apparatus comprising:
   a spherical light-emitting assembly;
   transmitting means placed upon the outer portion of said spherical light-emitting assembly;
   a light-sensing assembly disposed proximally to said transmitting means and having a substantially concave surface; and
   control mounted within said spherical light-emitting assembly for simultaneously transmission and reception of data.

9. The apparatus of claim 8, wherein:
   said transmitting means includes a plurality of light-emitting diodes mounted on the outer surface of said spherical light-emitting assembly; and
   said light-sensing assembly includes an infrared sensitive diode disposed at the focal point of a reflective concave surface mounted on the inner side of said spherical assembly.

10. The apparatus of claim 9, wherein:
    said light-sensing assembly is shielded from said transmitting means.

11. The apparatus of claim 10, wherein:
    said spherical light-emitting assembly includes an outer coating applied to said assembly after said apparatus has been tested electrically.

12. The apparatus of claim 11, wherein:
    said outer coating is a molded epoxy coating.

* * * * *